UNITED STATES PATENT OFFICE.

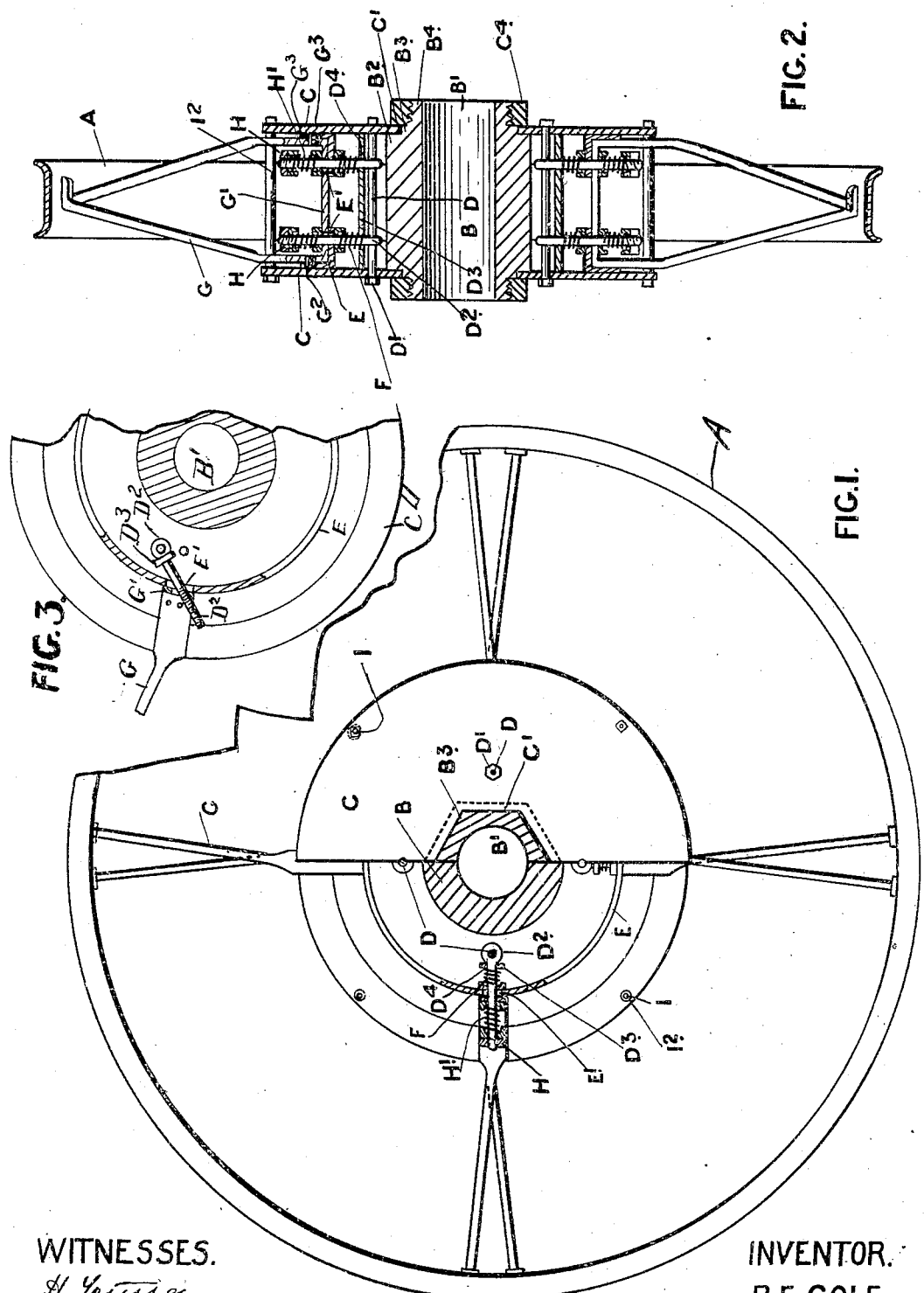

ROBERT EDGAR COLE, OF HIGHLAND CREEK, ONTARIO, CANADA.

CUSHION-WHEEL.

960,154.  Specification of Letters Patent.  Patented May 31, 1910.

Application filed April 13, 1908. Serial No. 426,879.

*To all whom it may concern:*

Be it known that I, ROBERT EDGAR COLE, of the village of Highland Creek, in the county of York, in the Province of Ontario, Canada, have invented certain new and useful Improvements in Cushion-Wheels, of which the following is the specification.

My invention relates to improvements in vehicle wheels, and the object of the invention is to provide a simple compact and easily assembled cushion wheel in which there is perfect freedom of movement in the working parts to reduce the shock or jar to the body of the vehicle wheel, especially when it strikes an obstruction in its path, and also to provide a wheel of this class which is not liable to get out of order, and it consists essentially of the wheel felly, a hub provided with annular removable flanges forming annular guideways cross bolts extending through the base of the flange in proximity to the hub, radial eye bolts swung thereon provided with nuts at their outer ends, spacing rings through which the bolts loosely pass, thereby holding such bolts equidistant apart, spokes supported on rings and connected to the felly and compression springs extending between the nuts and the rings between the rings and the cross bolts as hereinafter more particularly described by the following specification.

Figure 1, is a face elevation of my wheel shown partially in section. Fig. 2, is a central cross sectional view of Fig. 1. Fig. 3 is a sectional view showing the wheel partly disassembled.

In the drawings like letters of reference indicate corresponding parts in each figure.

A is the felly or rim of the wheel of any suitable form adapted to that class of vehicle to which it is intended.

B is the hub provided with the cylindrical bore B′ into which the axle extends and is secured by any suitable means. The periphery of the hub is provided with a shoulder B² in proximity to the end thereof, a sided reduced portion B³ located beneath the shoulder and a further reduced threaded portion B⁴.

C are annular removable flanges or plates having the central hole C′ which is formed with a flat sided boundary corresponding to the flat sided reduced portion B³ of the hub. The flanges C are held in place by the end nuts C⁴ which are threaded onto the reduced portion B⁴ of the hub. By this construction it will be seen that the flanges C are rigidly secured to the hub B and rotate in unison therewith.

D are cross bolts which extend through the flanges C near the inner edges thereof and are secured therein by suitable nuts D′.

D² are eye bolts swung on a cross bolt D at a suitable distance from each end thereof. The eye bolts D² are held in longitudinal position upon the cross bolts D by intermediate spacing plate D³ having holes D⁴ through which the eye bolts extend. It will be noticed that the eye bolts D² are designed to extend normally radially from the hub.

E are angle iron rings provided with slotted holes E′ through which the eye bolts are designed to extend.

F are compression springs encircling the eye bolts D² and extending between the angle iron ring E and the spacing plate D³. By this means it will be seen that the ring E is supported normally concentric with the center of the hub B.

G are spokes which are formed with an inner broad U-shaped portion G′, designed to extend and fit between the rings E and to extend radially therefrom. The radially extending members of the spokes are bent inwardly toward the center of the wheel and preferably slightly spread circumferentially apart, toward their outer ends as indicated by Fig. 1 of the drawing. The ends of the spoke members are secured to the rim of the wheel by any suitable means.

G² and G³ are rivets designed to secure the U-shaped portion of the spoke to the angle iron rings E.

It will be understood that the eye bolts D² extend loosely through the horizontal portion of the spoke member.

H are nuts threaded onto the outer extremity of the eye bolts D².

H′ are compression springs encircling the eye bolts and extending between the nuts H and the horizontal portion of the spoke member thereby resiliently securing such spoke member to the angle iron rings E.

I are cross bolts extending through the outer portion of the flanges C. The cross bolts I are provided with spacing sleeves I² designed to hold the outer portion of the flanges rigidly in position.

It will be seen from this description that when my wheel comes in contact with an obstruction it not only has movement on the vertical plane tending to throw the wheel into an eccentric position with relation to the hub but also a slight circumferential movement due to the connection of the spokes to the hub by means of the angle iron rings E, the eye bolt D², the cross bolt D. By this arrangement it will be seen that my wheel is cushioned to a maximum amount against shock due to coming into contact with an obstruction.

It will also be seen that in case of repair, being necessary through the breaking of the spring, or other cause my wheel is very simply disassembled by removing the bolts D and nuts D' and the nuts H so as to enable the bolt D² to be withdrawn through the slotted hole E' in a tangential direction to the periphery of the hub, thereby enabling a new spring to be inserted upon the eye bolt when necessary.

It will also be seen by this description that my wheel is very simple and compact in construction and that there is perfect freedom of movement between all the parts which will obviate any danger of their binding.

What I claim as my invention is:

In a vehicle wheel, the combination with a hub having reduced outer ends formed with flat sided portions and a further reduced threaded portion, of annular plates designed to fit on the flat sided reduced portions of the hub, nuts designed to be threaded onto the threaded portion of the hub against the central portion of the annular plates, cross bolts connecting the annular plates in proximity to the hub, intermediate cross bolts connecting the plates in proximity to the outer edge thereof, spacing rings held between the plates and having peripheral slots in the peripheral portion thereof, eye bolts swung upon the cross bolts located in proximity to the hub and extending intermediately of their length through the slots in the spacing rings, nuts threaded on to the outer ends of the bolts, spiral springs inserted between the eyes of eye bolts and the spacing rings, and between the spacing rings and the aforesaid nuts, and spokes suitably secured to such spacing rings and extending outwardly in an inclined direction to the rim of the wheel.

ROBERT EDGAR COLE.

Witnesses:
 B. Boyd,
 R. Cobain.